United States Patent
Wissling et al.

(10) Patent No.: US 10,927,875 B2
(45) Date of Patent: Feb. 23, 2021

(54) PUNCH RIVET AND METHOD FOR PRODUCING A PUNCH-RIVETED JOINT

(71) Applicant: NEWFREY LLC, New Britain, CT (US)

(72) Inventors: Matthias Wissling, Giessen (DE); Frank Wilhelm, Giessen (DE); Paul Bartig, Giessen (DE); Paul Hez, Giessen (DE)

(73) Assignee: NEWFREY LLC, New Britain, CT (US)

( * ) Notice: Subject to any disclaimer, the term of this patent is extended or adjusted under 35 U.S.C. 154(b) by 49 days.

(21) Appl. No.: 16/531,728

(22) Filed: Aug. 5, 2019

(65) Prior Publication Data

US 2019/0353192 A1    Nov. 21, 2019

Related U.S. Application Data (63) Continuation of application No. 15/674,904, filed on Aug. 11, 2017, now Pat. No. 10,371,190, and a (Continued)

(30) Foreign Application Priority Data

Feb. 11, 2015  (DE) .......................... 102015101950.7

(51) Int. Cl.
  *F16B 19/08* (2006.01)
  *B21J 15/02* (2006.01)
  (Continued)

(52) U.S. Cl.
  CPC .......... *F16B 19/086* (2013.01); *B21J 15/025* (2013.01); *B21J 15/04* (2013.01); *B21J 15/36* (2013.01); *F16B 19/10* (2013.01); *F16B 19/08* (2013.01)

(58) Field of Classification Search
  CPC ......... F16B 19/08; F16B 19/086; F16B 19/10
  (Continued)

(56) References Cited

U.S. PATENT DOCUMENTS 6,338,601 B1 *  1/2002  Mauer ................... B21J 15/025
                                            29/432.2
6,385,843 B1    5/2002  Singh et al.
(Continued)

FOREIGN PATENT DOCUMENTS

CN    2723754 Y    9/2005
DE    20319610 U   3/2004
EP    2080915 A    7/2009

*Primary Examiner* — Roberta S Delisle
(74) *Attorney, Agent, or Firm* — Michael P. Leary (57) ABSTRACT

A punch rivet for joining two workpieces, has a head and a shank. The shank is hollow with a shank internal diameter (D3), a shank external diameter (D1) and a shank end face. On the shank end face is a ring cutting edge with diameter (D4) that is smaller than the external diameter (D1) but greater than the internal diameter (D3). The ring cutting edge is radially spaced both from the shank external diameter (D1) and from the shank internal diameter (D3) by at least 20% of the radial shank wall thickness (M5). And the ratio D3/D1 of shank internal diameter D3 to shank external diameter D1 is smaller than 0.6. And the external diameter (D1) merges into an external circumference of the head by a second profile, which defines an underhead radius (R1), and the ratio of R1 to D1 (R1/D1) is smaller than 0.13.

10 Claims, 3 Drawing Sheets

Related U.S. Application Data continuation of application No. PCT/EP2015/076286, filed on Nov. 11, 2015.

(51) Int. Cl.
    *B21J 15/04*     (2006.01)
    *B21J 15/36*     (2006.01)
    *F16B 19/10*     (2006.01)

(58) Field of Classification Search
    USPC .......................................................... 411/501
    See application file for complete search history.

(56) References Cited

U.S. PATENT DOCUMENTS

| | | | |
|---|---|---|---|
| 6,988,862 B1 * | 1/2006 | Iguchi | B21J 15/025 |
| | | | 29/524.1 |
| 7,628,573 B2 | 12/2009 | Philipskötter et al. | |
| 7,762,753 B2 | 7/2010 | Jokisch | |
| 7,797,126 B2 * | 9/2010 | Wenzel | B21J 15/025 |
| | | | 702/158 |
| 8,506,228 B2 * | 8/2013 | Singh | F16B 19/08 |
| | | | 411/501 |
| 8,763,233 B2 | 7/2014 | Bartig | |
| 9,151,312 B2 | 10/2015 | Diehl et al. | |
| 2009/0070983 A1 | 3/2009 | Stumpf et al. | |

\* cited by examiner

PUNCH RIVET AND METHOD FOR PRODUCING A PUNCH-RIVETED JOINT

CROSS-REFERENCE TO RELATED APPLICATIONS

This application is a continuation of U.S. patent application Ser. No. 15/674,904, filed Aug. 11, 2017, which is a continuation of International Application PCT/EP2015/076,286, filed Nov. 11, 2015 which claims priority from German Patent Application No. 102015101950.7 filed Feb. 11, 2015, the disclosures of which are incorporated herein by reference in their entirety.

BACKGROUND OF THE INVENTION

The present invention relates to a punch rivet for joining two workpieces, said punch rivet having a head and a shank, wherein the shank is realized as a hollow shank with a shank internal diameter, a shank external diameter and a shank end face, wherein on the shank end face a ring cutting edge is realized, the diameter of which is smaller than the shank external diameter and wherein the shank internal diameter merges into the ring cutting edge by means of a cutting radius.

A punch rivet of this type is known from document DE 10 2005 052 360 B4 and from document DE 10 2009 039 936 A1.

The invention additionally relates to a method for producing a punch-riveted joint between at least two workpieces, one of which consists in particular of a high-strength material with a strength of at least 600 MPa and preferably of a maximum of 1000 MPa and comprises in particular a thickness of at least 0.5 mm. In addition, the present invention relates to a workpiece arrangement produced from at least two workpieces which are joined by means of at least one punch rivet of this type or by using a punch riveting method of this type.

Punch riveting is a transformative joining process and can be carried out using so-called solid rivets and so-called semi-hollow rivets. The present case is concerned with punch riveting using a semi-hollow rivet which is realized with a hollow shank. Said method is characterized in that the semi-hollow rivet is driven into an arrangement of two workpieces (in particular two metal sheets), the uppermost workpiece being pierced (perforated) by the hollow shank. A die on which the bottommost workpiece rests, is designed such that the hollow shank is hereafter radially expanded and is driven radially into the bottom workpiece such that an undercut is formed. In this case, the bottom workpiece is as a rule not severed such that the side of the bottom workpiece facing the die remains closed and as a result is less susceptible to rust. Said punch riveting method with a semi-hollow rivet has been used for some years more and more in the automobile industry. The punch riveting method is suitable in particular for joining workpieces produced from different materials (for example steel and aluminium). As there is a trend in particular in car body construction toward a combination of different materials adapted to the respective intended purpose, the punch riveting method is a joining method preferred for this case in comparison to welding.

It is obvious in this case that at least the material of the bottom workpiece on the die side should have good cold forming properties and should have material characteristics that are as homogeneous as possible.

As in the above-described field of application, there is a trend toward high-strength materials (for example strengths of the upper workpiece on the punch side of up to 1000 MPa), the punch rivets used for this purpose have to have a correspondingly high strength (rivet hardness), in particular in order to be able to pierce such a workpiece produced from a high-strength material. At the same time, the punch rivet is to have adequate deformability in its shank region in order to provide a sufficient undercut in the finished punch-riveted joint. Further criteria when punch riveting high-strength metal joints are a sufficiently high level of rigidity for penetrating such high-strength metal sheets as well as a sufficiently large shank interior volume in order to receive the punch slugs from the metal sheet layer on the punch side.

In the field of semi-hollow rivets there are different standard models, for example the so-called C rivet, as is known from document WO 95/09307. The semi-hollow rivet described there comprises a cylindrical hollow shank, a sharp ring cutting edge being realized on the exterior edge of the end face of the shank. For this purpose the internal diameter merges into the shank external diameter by means of a cutting radius. Said C-rivet was originally developed for pure aluminium joints or combinations of low strength steel plates. However, the C-rivet is less suitable for punch riveting high-strength workpieces as the C-rivet has a tendency to expand strongly during the punch riveting operation such that there is only a little material present in the undercut region of the bottom workpiece. The obtainable strength is consequently relatively small. A modified C-rivet with a sharp ring cutting edge which is, however, at a spacing from the shank external diameter is known from document DE 203 19 610 U1.

In addition, a so-called P-rivet is known in the prior art, for example from document DE 10 2005 052 360 B4.

In the case of said punch rivet, a ring cutting edge is realized on the shank end face, the diameter of which is smaller than the shank external diameter. The ring cutting edge is realized as a flat ring surface which is aligned in the radial direction and merges into the shank external diameter by means of a shank external bevel and as a result is at a spacing from the shank external diameter. The shank internal diameter merges into said ring surface by means of a relatively small radius.

The P-rivet certainly has better characteristics than the C-rivet when punch riveting high-strength workpieces. Nonetheless, there is still a need for improvement in this regard even with the P-rivet.

As a result of the increasing pressure on the automobile industry to make noticeable reductions in the $CO_2$ emissions, lightweight construction produced from high-strength and highest-strength metal sheets with corresponding sheet thicknesses and the reductions in weight that are achievable as a result become more and more important.

The semi-hollow punch rivet which was made known from document DE 10 2009 039 936 A1 mentioned in the introduction, is generally suitable for joining high-strength sheet layers. Nevertheless, there is generally a need for improvement with regard to the known semi-hollow punch rivets.

BRIEF SUMMARY OF THE INVENTION

Accordingly, it is the object of the present invention to provide an improved punch rivet and an improved method for producing a punch-riveted joint, by means of which high-strength workpieces can be joined in a reliable manner.

The above object is achieved with a punch rivet of the type mentioned in the introduction, where the diameter of the ring cutting edge is greater than the shank inside diameter, wherein the ring cutting edge is spaced by at least 20% of the radial shank thickness of the hollow shank both from the shank external diameter and from the shank internal diameter and wherein the ring cutting edge comprises a cutting ring face width which is smaller than 10% of the radial shank thickness of the hollow shank, in that the ratio of shank internal diameter to shank external diameter is smaller than 0.6.

It is particularly preferred when the ratio of shank internal diameter to shank external diameter is smaller than 0.55. In addition, it is preferred when said ratio is greater than 0.52.

In addition, the above object is achieved by a method for producing a punch-riveted joint between at least two workpieces, one of which consists in particular of a high-strength material with a strength of at least 600 MPa and comprises in particular a thickness of at least 0.5 mm, said method having the steps:

preparing a punch rivet according to the invention and
carrying out the punching operation, wherein the upper workpiece is pierced.

When realizing a ratio of shank internal diameter to shank external diameter smaller than 0.6, the result can be that the radial shank thickness is relatively large. As a result, such a punch rivet reaches a relatively high level of rigidity during a punch riveting process for penetrating high-strength sheets. On the other hand, however, it still has a sufficient ability to deform for realizing an undercut and in addition a shank internal volume (bore hole volume) which is still sufficiently large in order to receive the punch slug of the sheet layer on the punch side.

In addition, a sufficiently high residual bottom thickness can be achieved even in the case of high-strength sheet joints in light construction joints in automobile construction. The residual bottom thickness is the axial thickness of the material of the sheet layer on the punch side, at the point where the axial height of said sheet layer is at its smallest, this lying as a rule in the axial projection for instance in the region of the shank end face between shank internal diameter and shank external diameter.

Compared to the punch rivet which was made known from document DE 10 2009 039 936, a smaller expansion is obtained in the case of the punch rivet according to the invention, which is achieved substantially as a result of the radial shank thickness which is greater compared to said prior art. Said radial shank thickness is preferably greater than 1.1 mm and preferably greater than 1.2 mm in the case of the punch rivet according to the invention. In particular, the shank thickness is smaller than 1.7 mm.

The difference between the shank external diameter and the shank internal diameter is preferably greater than 2.2 mm in the case of the punch rivet according to the invention, in particular greater than 2.4 mm and preferably smaller than 3.0 mm. In a particularly preferred manner, said difference is greater than 2.45 mm and smaller than 2.6 mm.

The punch rivet according to the invention comprises a ring cutting edge, the diameter of which is smaller than the shank external diameter. As a result, too strong an expansion of the punch rivet, as occurs in the case of the C-rivet, is prevented.

The method according to the invention can be used for high-strength materials with a strength of at least 600 MPa, consequently with workpieces produced from steel but also with less solid materials such a light metals. It is also possible to join two workpieces produced from aluminium. In a preferred manner, the workpieces have a thickness of between 0.8 mm and 2.5 mm. In the case of particularly high-strength materials with a strength of up to 1000 MPa or even 1500 MPa or more, in a preferred manner the workpieces used are relatively thin, for example 0.8 mm.

The object is consequently completely achieved.

According to a further preferred embodiment, which provides an invention on its own in conjunction with the preamble of claim 1, the ring cutting edge merges by means of a profile into the shank internal diameter which includes a cutting radius and as an option a conical surface, wherein the ratio of cutting radius to shank external diameter is smaller than 0.3.

In some embodiments of the invention, in particular in comparison with the punch rivet which was made known from document DE 10 2009 039 936 A1, a less pointed geometry of the shank in the region of the end face can be achieved as a result of said measure. This can contribute to the fact that the punch rivet expands less radially during the punch riveting process, but can nevertheless provide sufficient deformability to realize an undercut.

According to a preferred embodiment, the ring cutting edge merges into the shank internal diameter by means of a profile which comprises a cutting radius which adjoins the ring cutting edge and which merges tangentially into the shank internal diameter, wherein a ratio of cutting portion height to shank external diameter is smaller or equal to 0.25.

In particular, said ratio can be smaller than 0.23, preferably smaller than 0.2.

In the region of the transition from cutting radius to ring cutting edge, in this case an opening angle is preferably set up which is greater than 90°, but is preferably smaller than 135°.

In this case, it is particularly advantageous when the ring cutting edge merges into the shank internal diameter by means of a profile which comprises a cutting radius which adjoins the ring cutting edge and which merges tangentially into a conical surface which adjoins the shank internal diameter.

The boundary between the conical surface and the shank internal diameter can be rounded off by a suitable small radius.

As a result of said measure, the opening angle adjoining the ring cutting edge can be relatively large, it being possible to set up a geometry of the shank that is not too bulky, however, as a result of the conical surface.

The conical surface preferably defines an opening angle which is smaller than 50°.

In this connection, the opening angle can be in particular smaller than 40°, preferably smaller than 35°. In any case, the conical angle is preferably greater than 20°.

According to an alternative embodiment, the ring cutting edge merges into the shank internal diameter by means of a profile which comprises a cutting radius which adjoins the shank internal diameter and which merges tangentially into a conical surface which adjoins the ring cutting edge.

In the case of said embodiment, in the region of its interior at the transition between the ring cutting edge and the shank internal diameter, the shank initially comprises a conical surface which then merges into the shank internal diameter by means of the cutting radius. An opening angle can be precisely defined as a result.

Accordingly the conical surface preferably comprises an opening angle which is greater than 55°.

In particular, the opening angle can be greater than 60°, preferably greater than 80°. The opening angle of the conical surface is preferably smaller than 90°.

According to further alternative embodiments, the ring cutting edge into the shank internal diameter merges by means of a profile which comprises a conical surface which adjoins the ring cutting edge and which adjoins the shank internal diameter.

Insofar as two surfaces adjoin one another, as in the present case the conical surface and the shank internal diameter, it can be preferred when a transition is effected between said surfaces over small radii of curvature.

According to further preferred embodiment, the shank external diameter merges by means of an underhead radius and a head cone into the external circumference of the head, wherein the ratio of the underhead radius to the shank external diameter is smaller than 0.13.

The head cone preferably directly adjoins the external circumference of the head.

In contrast to a transition from the shank external diameter to the external circumference of the head by means of one single underhead radius, i.e. without head cone, where applicable, a higher axial holding force of the punch-riveted joint can be produced as a result.

In addition, it is preferred when the ring cutting edge merges into the shank external diameter by means of a shank external bevel which is aligned at a bevel angle smaller than 40° with reference to a radial plane and/or which comprises an axial external bevel height which is smaller than or equal to 0.3 mm.

The expanding of the shank during the punch riveting process can be suitably adjusted as a result.

In addition, it is advantageous when the ratio of cutting radius to shank external diameter is smaller than 0.7. As a result the shank is prevented from becoming too thin in the region of the end face. Consequently, a high punching effect can be obtained even in the case of high-strength steels.

It can be advantageous when the shank external bevel merges into the shank external diameter by means of a transition radius. The transition radius can be a very small radius of, for example, smaller than 0.2 mm, in particular smaller than 0.15 mm. Stresses in this region during the punching operation are avoided as a result of the transition radius.

According to a further preferred embodiment, the ratio of a head external diameter to the shank external diameter is smaller than 1.44.

As a result of said measure, the punch rivet is provided with a relatively large shank external diameter. The ring surface which the shank comprises in the axial projection can be enlarged as a result. The stability of the punch rivet during the punching operation can be increased as a result.

Overall, it is additionally preferred when the ring cutting edge comprises a cutting ring surface which is aligned in the radial direction, the radial width of which is chosen such that the ratio of ring surface width to the radial thickness of the shank is within the range of between 0.02 and 0.08.

The ring surface width is consequently generally smaller compared to the P-rivet such that a collapsing or compressing of the shank during a punching operation is better able to be prevented.

It is to be understood that the above-mentioned features and the features yet to be explained below can be used not only in the respectively provided combination but also in other combinations or standing alone without departing from the framework of the present invention.

BRIEF DESCRIPTION OF THE DRAWINGS

Exemplary embodiments of the invention are shown in the drawing and are explained in more detail in the following description, in which drawings.

DETAILED DESCRIPTION OF THE PREFERRED EMBODIMENTS

Figure 6:
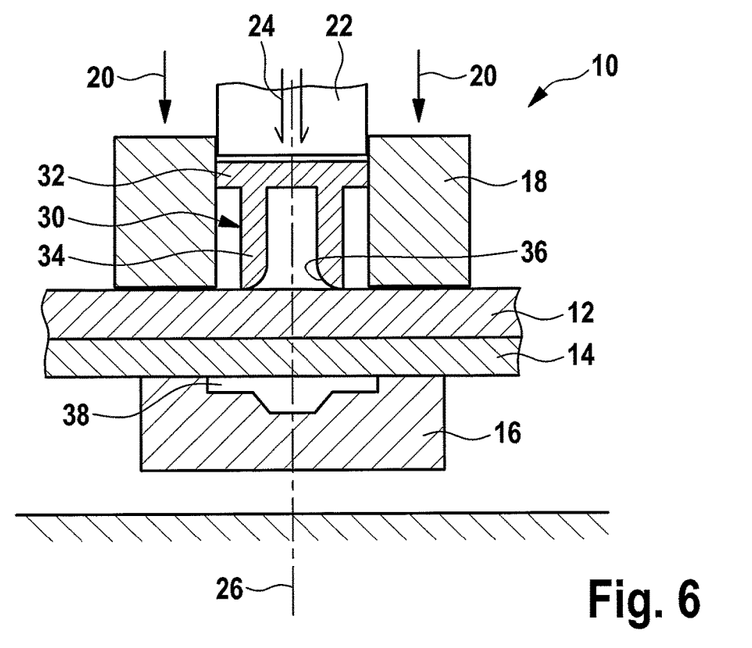
FIG. 6 shows a schematic representation of a punch riveting device.

A punch riveting device is given the general reference of 10 in FIG. 6.

The punch riveting device 10 serves for the purpose of joining a first workpiece 12 and a second workpiece 14 together. The workpieces 12, 14 can be in particular sheets, such as are used in vehicle body construction. The thickness of the workpieces 12, 14 can be within the range of between, for example, 0.5 mm and 4 mm, in particular within the range of between 1 mm and 2.5 mm. The materials of the workpieces 12, 14 must meet the usual requirements for materials that can be cold formed. These materials are frequently alloyed metals such as steel, aluminium and magnesium. However, it is also possible to produce one of the workpieces 12, 14, in particular the upper workpiece, from a plastics material.

The punch riveting device 10 comprises a die 16, onto which the workpieces 12, 14 are placed directly one on top of the other. Hold-down clamps which are pressed onto the workpiece arrangement at a certain hold-down force 20 serve for fixing the workpieces. A punch 22, which is movable along a longitudinal axis 26 toward the die 16 at a predetermined punch riveting force 24, is arranged between the hold-down clamps 18. The punch 22 serves for the purpose of driving a punch rivet 30 into the workpiece arrangement 12, 14. The punch rivet 30 is realized as a semi-hollow punch rivet, with a head 32 and a hollow shank 34 which extends from said head in the axial direction and on the end face of which a cutting edge 36 is realized.

When the punch 22 moves down, the shank 34 initially pierces the upper workpiece 14 on the punch side such that a so-called punch slug is cut out from said upper workpiece. As the punching operation progresses, the free shank end 34 is driven into the workpiece 14 on the die side. A cavity 38, which in a manner known per se enables the shank 34 to expand radially as the punch riveting operation progresses such that the free end of the shank 34, when viewed in the axial direction, penetrates behind material of the workpiece 14 on the die side, is realized in the die 16. As a rule, the punch rivet 30 is driven into the workpiece arrangement 12, 14 by such an amount until the head closes off in a flush manner with the surface of the workpiece 12 on the punch side.

Different types of punch rivets 30 are available as a rule for the joining of workpieces produced from the most varied materials.

Figure 1:
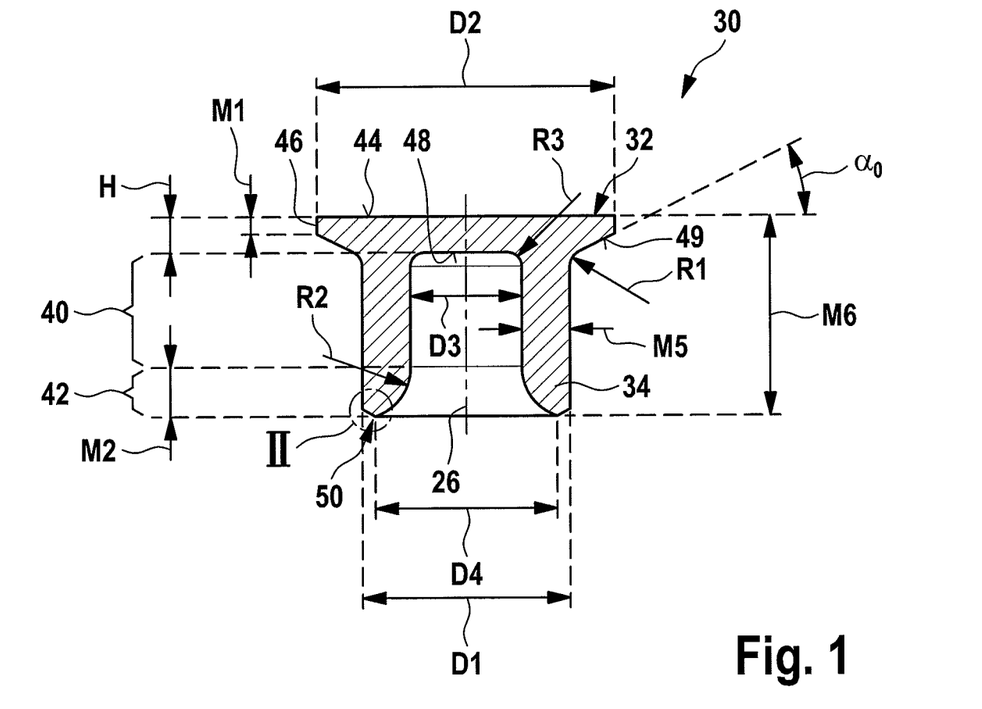
FIG. 1 shows a longitudinal sectional view through an embodiment of a punch rivet according to the invention.
Figure 2:
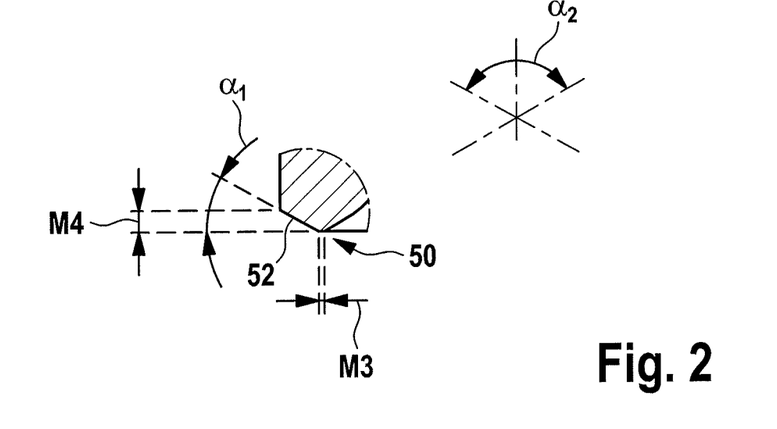
FIG. 2 shows a view of a detail II of FIG. 1.

FIGS. 1 and 2 show an embodiment of a punch rivet 30 according to the invention which is suitable, in particular, in conjunction with workpieces 12, 14 produced from high-strength materials. In this case, the workpiece 14 on the die side can comprise a strength, for example, of greater than 400 MPa, preferably however of not more than 1200 MPa. The workpiece on the punch side can comprise high-strength materials with strengths of up to 1000 MPa or more than 1000 MPa or more than 1200 MPa.

The punch rivet 30 itself is also produced from a high-strength material, for example with a rivet hardness of greater than 1500 MPa, in particular greater than 1700 MPa.

The punch rivet 30 is realized so as to be rotationally symmetrical about the longitudinal axis 26 and comprises a head 32 and a shank 34. The shank 34 is divided into a shank portion 40 which connects to the head 32 and a cutting portion 42. The shank portion 40 is realized in a hollow cylindrical manner and comprises a shank external diameter D1 and a shank internal diameter D3. The cutting portion 42 comprises a cutting portion height M2.

The head 32 comprises a flat head top surface 44 and a cylindrical head external surface 46. The head top surface 44 comprises a head external diameter D2. The head external surface 46 comprises a head external surface height M1. Inside the shank 34, the head 32 comprises a head bottom surface 48 which, in the present case, is realized obtusely tapered or roundedly reduced and merges into the shank internal diameter D3 by means of a head internal radius R3. On the external circumference, the shank external diameter D1 merges into the bottom surface of the head external surface 46 by means of an underhead radius R1. In this case, the underhead radius R1 is arranged such that it merges tangentially into both the shank external diameter D1 and into a conical surface 49 which is arranged at a head cone angle $\alpha_0$ with respect to the head top surface 44. The head 32 comprises a head height H which extends from the head top surface 44 to the head bottom surface 48.

A ring cutting edge 50, which is realized as a planar cutting ring surface and extends in the radial direction (see FIG. 2), is realized on the end face of the shank 32, more precisely of the cutting portion 42. The internal diameter of the cutting ring surface is shown at D4. In addition, the cutting ring surface comprises a radial width M3. In the axial projection, the ring cutting edge 50 consequently lies somewhat outside the middle shank diameter which is formed by the average between the shank external diameter D1 and the shank internal diameter D3.

The external circumference of the cutting ring surface merges into the shank external diameter D1 by means of a shank external bevel 52. The shank external bevel 52 assumes an angle $\alpha_1$ with a radial plane. In addition, the shank external bevel 52 merges into the shank external diameter D1 by means of a transition radius which is not designated in any more detail. The external bevel height is shown in FIG. 2 at M4.

The internal circumference of the cutting ring surface merges into the shank internal diameter D3 by means of a cutting radius R2. In this case, the cutting radius R2 merges tangentially into the shank internal diameter D3 and ends by realizing an opening angle in the cutting ring surface. The radius R2 extends more precisely from the shank internal diameter D3 toward the cutting ring surface in such a manner that the inside surface of the shank produces an opening angle $\alpha_2$ of approximately 100°. The opening angle $\alpha_2$, in the case of said embodiment, should be greater than 80° and is preferably smaller than 135°.

The above-mentioned dimensions of the punch rivet 30 are provided in the following table 1. On the one hand, preferred value ranges are given for the respective values and in addition an example of a particularly preferred embodiment, as is shown in FIG. 2. In addition, the table 1 gives preferred ratios of said dimensions from which it can be seen how a punch rivet according to the invention can be dimensioned for application examples.

TABLE 1

| | Designation | Value range | Example | Ratios |
|---|---|---|---|---|
| Shank external diameter | D1 | ≥5.2 mm | 5.40 mm | |
| Head external diameter | D2 | ≤8.0 mm | 7.75 mm | D2/D1 < 1.45 |
| Shank internal diameter | D3 | ≤3.2 mm | 2.90 mm | D3/D1 < 0.6 |
| Ring cutting edge diameter | D4 | | 4.60 mm | D4 > (D1 − D3)/2 |
| Head external surface height | M1 | ≤0.70 mm | 0.50 mm | |
| Cutting portion height | M2 | ≤1.90 mm | 1.35 mm | M2/D1 > 0.25 |
| Cutting ring surface width | M3 | >0 AND ≤0.10 mm | 0.05 mm | 0.02 < M3/M5 < 0.08 |
| External bevel height | M4 | ≤0.3 mm | 0.20 mm | M4/D1 < 0.05 |
| Shank thickness | M5 | ≥1.1 mm | 1.25 mm | |
| Rivet length | M6 | variable | 5.5 mm | |
| Cutting cone height | M7 | — | — | |
| Head cone angle | $\alpha_0$ | >20° | 27.5° | |
| Bevel angle | $\alpha_1$ | ≤40° | 30° ± 10° | |
| Opening angle | $\alpha_2$ | ≥55° | 100° | |
| Head height | H | ≤1.5 mm | 1.00 mm | |
| Underhead radius | R1 | ≤0.8 mm | 0.5 mm | R1/D1 < 0.13 |
| Cutting radius | R2 | <2 mm | 1.50 mm | R2/D1 < 0.3 |
| Head internal radius | R3 | | 0.35 mm | |

The shank 30 comprises in the region of the shank portion 40 a shank thickness M5 which is equal to half of the difference between the shank external diameter D1 and the shank internal diameter D3. In the axial projection, the shank 34 additionally comprises a ring surface which is defined on the external circumference by the shank external diameter D1 and on the inside circumference by the shank internal diameter D3.

In addition, it is obvious that the punch rivet 30 can be realized in different lengths, in this connection in each case the length of the shank portion 40 varying. In contrast, the cutting portion 42 preferably remains unchanged with all the embodiments with different lengths.

FIG. 1 shows the axial overall length of the punch rivet 30 at M6.

As a result of the ratio of D2/D1<1.45 the punch rivet 30 can be realized with a relatively large shank external diameter, as a result of which the stability is increased during the punch riveting operation. As a result of the ratio D3/D1<0.6 the shank 34 can be realized with a relative large ring surface in the axial projection.

As a result of the ratio of D4<(D1−D3)/2 it can be ensured that the shank has a tendency rather to move radially outward during a punching operation and as a consequence supports the cold forming for the purpose of the undercut in the workpiece on the side of the die.

The result of the ratio of M2/D1>0.25 can be that a relatively large volume can be received in the interior of the shank during the punching operation. Accordingly, it is possible for the shank to receive at least extensively a punch slug severed out of the workpiece on the die side. This prevents the punch slug being pressed down axially by the shank, which would result either in the punch rivet being compressed or in a fracture in the workpiece on the side of the die.

As a result of the ratio between the cutting ring surface width M3 and the shank thickness M5 it can be ensured that a good punching effect can be achieved with a high degree of stability. This also applies to the ratio between the external bevel height and the shank external diameter (M4/D1<0.05).

The result of the ratio of R2/D1≤0.3 or <0.3 is that the transition from the ring cutting edge to the shank internal diameter can be realized somewhat more obtusely such that in spite of the relatively large radial shank thickness an expanding operation is supported in order to realize a sufficient undercut in a produced punch-riveted joint.

Figure 3:
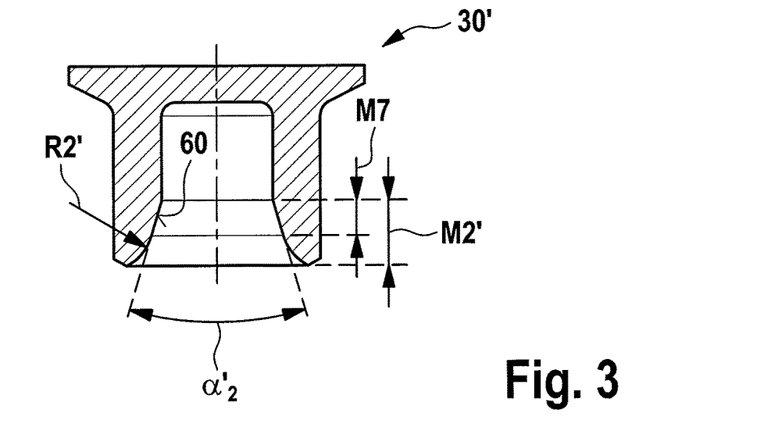
FIG. 3 shows a longitudinal sectional view through a further embodiment of a punch rivet according to the invention.
Figure 5:
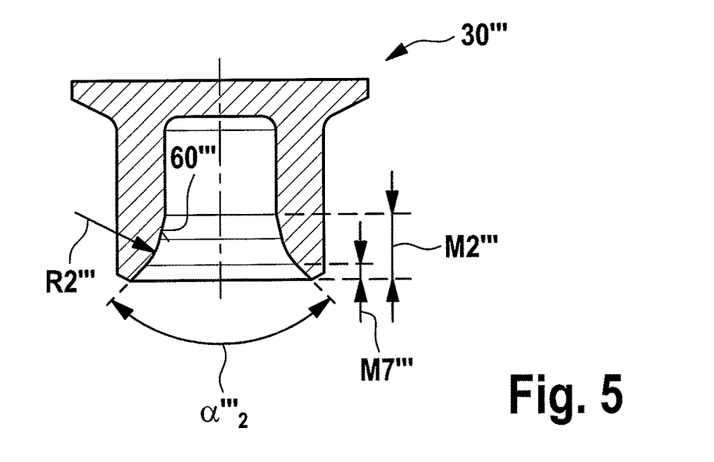
FIG. 5 shows a longitudinal sectional view through a further embodiment of a punch rivet according to the invention.

FIGS. 3 and 5 show further embodiments of punch rivets which correspond in general to the punch rivet 30 of FIGS. 1 and 2 as regards design and method of operation. Identical elements are consequently characterized by identical references. Essentially the differences are explained below.

In the case of the punch rivet 30' of FIG. 3, the ring cutting edge merges into the shank internal diameter by means of a profile which comprises a cutting radius R" which adjoins the ring cutting edge and which merges tangentially into a conical surface 60 which adjoins the shank internal diameter. The conical surface 60 comprises in this case an opening angle $\alpha_2'$ which is smaller than 50°, in the present case is equal to 30°.

Said embodiment combines a relatively obtuse portion in the region of the ring cutting edge to the conical surface 60 which is defined by the cutting radius R2' which, for example, can be 1.5 mm. The conical surface, which defines a relatively small opening angle $\alpha_2'$, is provided in contrast at the transition from the cutting radius R2' to the shank internal diameter. The conical surface 60 extends in the case of said embodiment over a cutting cone height M7. In the case of said embodiment and in the case of subsequent embodiments, the cutting cone height M7 can generally be within a range of greater than 0.2 mm and smaller than or equal to 1.4 mm. In the case of the embodiment in FIG. 3, the cutting cone height M7 can be in particular within a range of between 0.9 mm and 1.2 mm.

Figure 4:
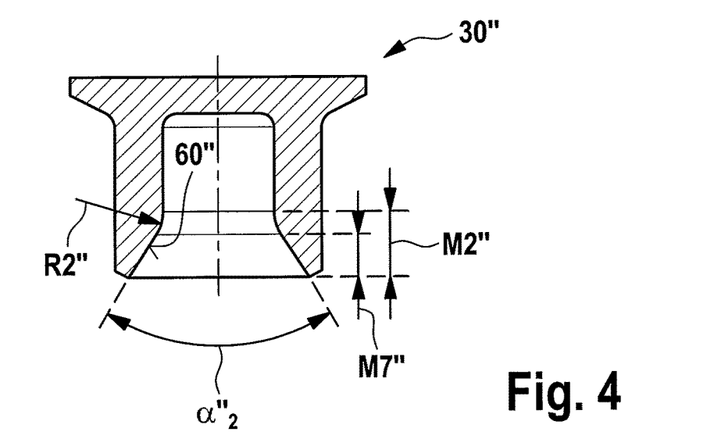
FIG. 4 shows a longitudinal sectional view of a further embodiment of a punch rivet according to the invention.

FIG. 4 shows a further embodiment of a punch rivet 30" where the ring cutting edge merges into the shank internal diameter by means of a profile which comprises a cutting radius R2" which adjoins the shank internal diameter and which merges tangentially into a conical surface 60" which adjoins the ring cutting edge.

The conical surface 60" defines an opening angle of 60° in this connection.

In this connection, another relatively large opening angle is obtained which can support the shank portion expanding. In addition, said conical region merges into the shank internal diameter by means of a relatively small cutting radius R2", R2" for example being able to be 1.5 mm. The value of the cutting cone height M7" can be, for example, smaller than 0.9 mm and greater than 0.2 mm in the case of said embodiment.

FIG. 5 shows a further embodiment of a punch rivet 30''' which is generally similar to the punch rivet 30" in FIG. 4 as regards design. In this connection, however, the conical surface 60''' comprises an opening angle $\alpha_2'''$ which is greater than 60°, in the present case 85°. The cutting radius R2''', in this connection, however, is just as large as in the case of the punch rivet 30" of FIG. 4. In the case of the embodiment in FIG. 5, the cutting cone height M7''' can be relatively small, in particular smaller than 0.4 mm. Where applicable, another further conical portion with a very small opening angle of <30° can be provided between the portion with the radius R2''' and the shank internal diameter (not identified in any more detail in FIG. 5).

Figure 7:
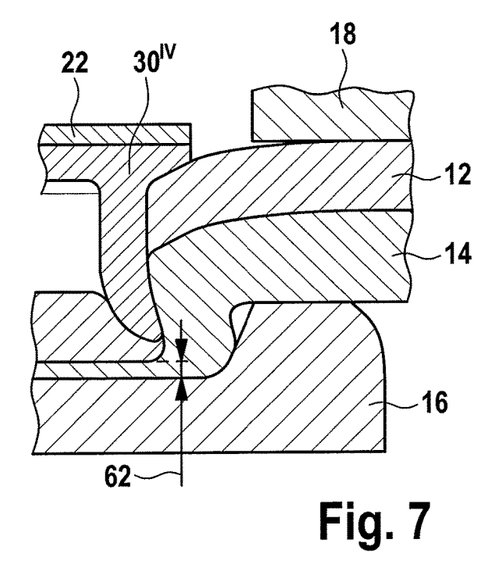
FIG. 7 shows a schematic representation of a punch-riveted joint produced according to the invention.
Figure 8:
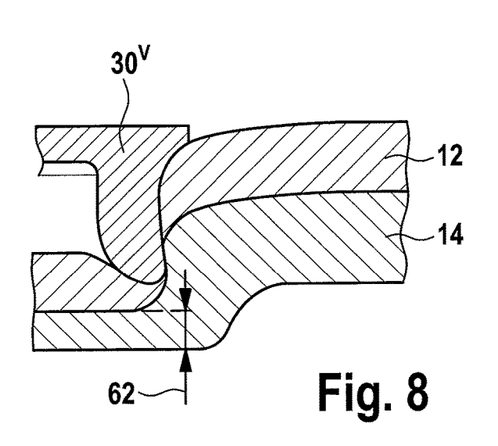
FIG. 8 shows a schematic representation of a further punch-riveted joint produced according to the invention.

FIG. 7 and FIG. 8 show in each case further embodiments of punch rivets $30^{IV}$, $30^{V}$, which can correspond to any arbitrary one of the above-designated embodiments. In both cases, a finished punch-riveted joint is shown in each case.

It must be recognized that in both cases a relatively high residual bottom thickness 62 is able to be achieved.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A punch rivet for joining two workpieces, the punch rivet comprising:
   a head;
   a hollow shank extending axially from the head with a shank internal diameter (D3), a shank external diameter (D1), a radial shank wall thickness (M5), an axial shank end face distal from the head, and a ring cutting edge located on the shank end face, and the ring cutting edge defines a cutting edge diameter (D4) which is smaller than the shank external diameter (D1) and greater than the shank internal diameter (D3), and the ring cutting edge is radially spaced by at least 20% of the radial shank wall thickness (M5) both from the shank external diameter (D1) and from the shank internal diameter (D3), and wherein the ring cutting edge defines a cutting ring surface width (M3) which is smaller than 10% of the radial shank wall thickness (M5);
   a ratio (D3/D1) of shank internal diameter (D3) to shank external diameter (D1) is smaller than 0.6; and
   the shank external diameter (D1) merges into an external circumference of the head by a second profile, which defines an underhead radius (R1), and a head cone, and the ratio (R1/D1) of the underhead radius (R1) to the shank external diameter (D1) is smaller than 0.13.

2. The punch rivet according to claim 1, wherein the ring cutting edge merges into the shank internal diameter (D3) by a profile which defines a cutting radius (R2) and a ratio (R2/D1) of cutting radius (R2) to shank external diameter (D1) is smaller than 0.3.

3. The punch rivet according to claim 2, wherein the profile with the cutting radius (R2) adjoins the ring cutting edge and merges tangentially into the shank internal diameter (D3), and a ratio (M2/D1) of cutting portion height (M2) to shank external diameter (D1) is smaller than or equal to 0.25.

4. The punch rivet according to claim 2, wherein the profile with the cutting radius (R2) adjoins the ring cutting edge and merges tangentially into an inner conical surface axially between the profile and the shank internal diameter (D3).

5. The punch rivet according to claim 4, wherein the inner conical surface defines an opening angle ($\alpha 2$) which is smaller than 50°.

6. The punch rivet according to claim 2, wherein the profile which defines a cutting radius (R2) is adjacent to the shank internal diameter (D3) and merges tangentially into an inner conical surface axially between the profile and the ring cutting edge.

7. The punch rivet according to claim 6, wherein the inner conical surface defines an opening angle ($\alpha 2$) which is greater than 55°.

8. The punch rivet according to claim 2, wherein the profile which defines the cutting radius (R2) is located axially between a first inner conical surface adjoining the ring cutting edge and a second inner conical surface adjoining the shank internal diameter.

9. The punch rivet according to claim 1, wherein the ring cutting edge merges into the shank external diameter (D1) by a shank external bevel which defines at least one of a bevel angle ($\alpha_1$) smaller than 40° with reference to a radial plane and an axial external bevel height (M4) smaller than or equal to 0.3 mm.

10. A method for producing a punch-riveted joint between a first workpiece and a second workpiece, the second workpiece made of a high-strength material with a strength of at least 600 MPa and a thickness where joined of at least 0.5 mm, wherein the method comprises the steps of:
- arranging the workpieces so that one of either the first workpiece or the second workpiece is an upper workpiece;
- providing a punch rivet comprising:
  - a head;
  - a hollow shank extending axially from the head with a shank internal diameter (D3), a shank external diameter (D1), a radial shank wall thickness (M5), an axial shank end face distal from the head, and a ring cutting edge located on the shank end face, and the ring cutting edge defines a cutting edge diameter (D4) which is smaller than the shank external diameter (D1) and greater than the shank internal diameter (D3), and the ring cutting edge is radially spaced by at least 20% of the radial shank wall thickness (M5) both from the shank external diameter (D1) and from the shank internal diameter (D3), and wherein the ring cutting edge defines a cutting ring surface width (M3) which is smaller than 10% of the radial shank wall thickness (M5);
  - a ratio (D3/D1) of shank internal diameter (D3) to shank external diameter (D1) is smaller than 0.6; and
  - the shank external diameter (D1) merges into an external circumference of the head by a second profile, which defines an underhead radius (R1), and a head cone, and the ratio (R1/D1) of the underhead radius (R1) to the shank external diameter (D1) is smaller than 0.13; and
- carrying out a punch riveting operation, wherein the upper workpiece is pierced.

* * * * *